United States Patent Office 2,768,985
Patented Oct. 30, 1956

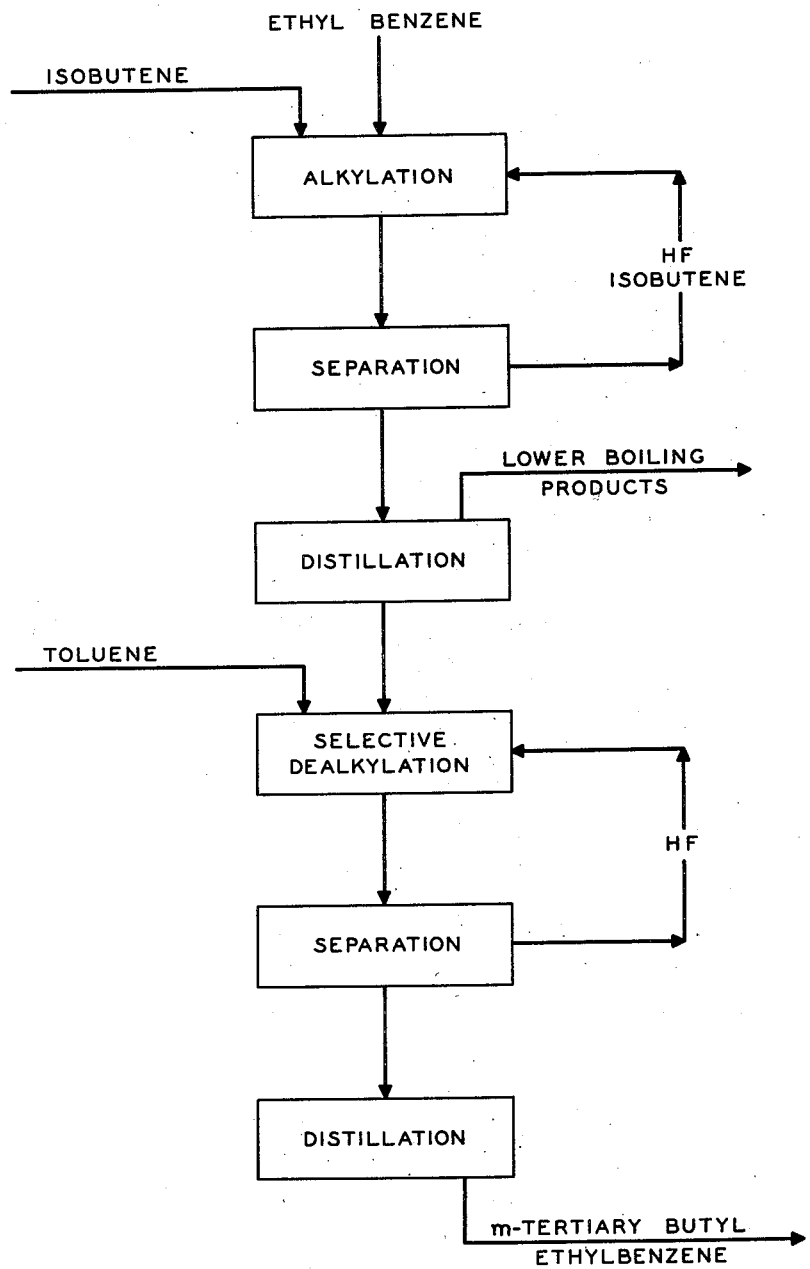

2,768,985

PREPARATION OF META-DIALKYLBENZENES

Maurice J. Schlatter, El Cerrito, Calif., assignor to California Research Corporation, San Francisco, Calif., a corporation of Delaware Application June 23, 1951, Serial No. 233,249

5 Claims. (Cl. 260—671)

This invention relates to a process for the production of meta-dialkylbenzenes. More particularly, the invention relates to the production of meta-dialkylbenzenes in which one of the alkyl groups is a tertiary-alkyl group.

When tertiary-alkylbenzenes are alkylated with a non-tertiary-alkylating agent, the agent attaches itself to the benzene nucleus at the para position more readily than it does at the meta position or otho position. Similarly, when an alkylbenzene is alkylated with a tertiary-alkylating agent, the tertiary-alkylating agent tends to attach itself to the benzene nucleus in para relationship to the original alkyl group more readily than in either meta or ortho relationship to that group. As a result of this tendency, attempts to produce meta-dialkylbenzenes in which one or both of the alkyl groups are tertiary-alkyl groups usually result in the production of mixtures of dialkylbenzene isomers predominating in the para-isomer. This is especially true if the original alkyl group of the alkylbenzene is a tertiary-alkyl group or a large non-tertiary-alkyl group. Separation of the meta-dialkyl isomer from these reaction mixtures is usually a difficult undertaking since the isomers commonly boil at very nearly the same temperatures.

The meta-dialkylbenzenes are valuable chemical intermediates which may serve as starting materials for the production of a variety of tri-substituted benzenes.

It is the object of the present invention to provide a method for producing substantially pure meta-alkyl-tertiary-alkylbenzenes and meta-di-tertiary-alkylbenzenes.

Pursuant to the invention a mono-alkylbenzene is contacted with a molar excess of tertiary-alkylating agent under alkylating conditions to produce alkyl di-tertiary-alkylbenzenes. The reaction product is fractionally distilled to separate an alkyl di-tertiary-alkylbenzene fraction which is then contacted with a material of a group consisting of benzene, toluene, ortho-xylene, phenol and metaxylene in the presence of an alkylation catalyst under mild alkylating conditions to effect the transfer of one tertiary-alkyl group from the alkyl di-tertiary-alkylbenzene to the acceptor. The reaction product mixture is then frictionally distilled to separate a fraction comprising a meta-dialkylbenzene containing at least one tertiary-alkyl group.

The alkylbenzene constituting the charging stock employed in the first described embodiment of the invention may be any mono-alkylbenzene from toluene to mono-alkylbenzenes containing 18 to 20 carbon atoms in the alkyl chain. If the alkyl group of the alkyl-benzene is a tertiary-alkyl group, the alkylating conditions employed in the following alkylation step must be somewhat more severe than would be required with a non-tertiary-alkylbenzene.

The term "tertiary-alkylating agent" is employed herein to indicate an alkylating agent containing a tertiary carbon atom having no hydrogen atom bonded to it. Suitable tertiary-alkylating agents for use in the process of the invention include tertiary-olefins, tertiary-alcohols, tertiary-alkyl chlorides, and the corresponding tertiary-cycloalkenes, tertiary-cycloalkanols, tertiary-cycloalkyl halides. Of the numerous tertiary-alkylating agents available, it is preferred to employ those which introduce a tertiary-butyl group into the material undergoing alkylation, for example, isobutene, tertiary-butyl alcohol, tertiary-butyl chloride, tertiary-butyl mercaptan, and di-isobutylene. Tertiary-alkylating agents of higher molecular weight such as the $C_5$ to $C_7$ tertiary-olefins, tertiary-alcohols and tertiary-alkyl chlorides are operative. Also, tertiary-cycloalkyl olefins such as 1-methylcyclopentene and 1-methyl-cyclohexene are suitable.

Catalysts or condensing agents which can be used in both the alkylating step and in the step of transferring a tertiary-alkyl group to benzene, toluene, ortho-xylene, phenol or meta-xylene include hydrofluoric acid, sulfuric acid, Friedel-Crafts catalysts such as zinc chloride, aluminum chloride, ferric chloride, or boron trifluoride, and complexes of Friedel-Crafts catalysts with organic polar liquids such as nitrobenzene, chloroform and nitromethane.

Both the alkylation reaction and the transfer of the tertiary-alkyl group to benzene, toluene, ortho-xylene or meta-xylene are conducted at temperatures in the range about minus 10 to plus 100° C. It is preferable to employ relatively mild alkylating conditions in the alkyl transfer step in order that any tendency toward isomerization of the meta-alkyl-tertiary-alkylbenzene product may be suppressed and, accordingly, this step of the process is preferably conducted at temperatures below about 70° C., though the optimum temperatures for different catalysts will not necessarily be the same.

The appended drawing is a block flow diagram illustrating the production of meta-dialkyl benzenes containing at least one tertiary-alkyl group pursuant to the present invention.

The process of the invention is illustrated by the following examples in which toluene is alkylated with isobutene to produce 3,5-di-tertiary-butyltoluene which is then equilibrated with meta-xylene to effect transfer of one of the tertiary-butyl groups to the meta-xylene, whereby meta-tertiary-butyltoluene is produced. The alkylation of the toluene is deliberately conducted in two steps in the example in order to illustrate the effect of alkylating toluene with small amounts of isobutene. In this first step a mixture of meta-tertiary-butyltoluene and para-tertiary-butyltoluene is produced. This mixture is then subjected to further alkylation with tertiary-butyl chloride; however, further quantities of isobutene are equally effective to produce 3,5-di-tertiary-butyltoluene.

Example 1

A cold mixture of 1322 g. (14.4 moles) of toluene and 161 g. (2.88 moles) of isobutene was added over a period of 83 minutes to 319 g. (15.9 moles) of liquid hydrogen fluoride which was vigorously stirred in a stainless steel flask. The temperature was maintained at 1-8° C. by cooling the flask in an ice bath. After the addition was complete, stirring was continued for 35 minutes and the reaction mixture poured on crushed ice. The hydrofluoric acid was neturalized with excess potassium hydroxide, the organic phase separated, washed with water, dried over potassium carbonate and distilled. After removal of the toluene, the product consisted of 97.5% by weight of mono-tertiary-butyltoluenes boiling at 188-195° C. and 2.5% of higher boiling products. Spectrometric analysis of the mono-tertiary-butyltoluene fraction showed that it contained approximately equal amounts of meta-tertiary-butyltoluene and para-tertiary-butyltoluene.

A mixture containing approximately 357 g. (2.42 moles) of meta-tertiary-butyltoluene and 357 g. (2.42 moles) of para-tertiary-butyltoluene was cooled to 0° C. in a copper flask immersed in an ice bath and 198 g. (9.9 moles) of liquid hydrogen fluoride added. The mixture was stirred vigorously and 276 g. (3.0 moles) of tertiary-butyl chloride added over a period of one hour. The temperature was held at 0-2° C. Stirring was continued for three hours and the product worked up essentially as described above. This gave 550 g. of 3,5-di-tertiary-butyltoluene boiling at 235–238° C. A sample, recrystallized from the melt, melted at 31.4° C.

A mixture of 431.5 g. (2.12 moles) of 3,5-di-tertiary-butyltoluene, 450 g. (4.24 moles) of meta-xylene and 177 g. (8.8 moles) of liquid hydrogen fluoride was vigorously stirred for two hours at 0° C. in a copper flask cooled in an ice bath. The contents of the flask were poured on crushed ice, neutralized with excess potassium hydroxide and the organic phase separated, washed with water, dried over potassium carbonate and fractionally distilled. The reaction product had the following composition:

| | Percent by weight |
|---|---|
| Toluene | 1.2 |
| Meta-tertiary-butyltoluene | 24.4 |
| 1,3-dimethyl-5-tertiary-butylbenzene | 30.5 |
| Meta-xylene (recovered) | 32.1 |
| 3,5-di-tertiary-butyltoluene (recovered) | 11.8 |

The total mono-tertiary-butyltoluene cut boiling from 180 to 200° C. was shown spectrometically to contain more than 95% meta-tertiary-butyltoluene, less than 2% of para-tertiary-butyltoluene and small amounts of other compounds. Center-cut product, boiling at 189.4 to 189.8° C., $n_D^{20}$, 1.4949, was almost pure meta-tertiary-butyltoluene, contained no ortho isomer and less than 0.5% of para-tertiary-butyltoluene. Nitration with a mixture of concentrated sulfuric acid and fuming nitric acid gave a trinitro derivative with a musk-like odor, M. P. 96.2–96.5° C.

The fact that a mixture of 2.42 moles of meta-tertiary-butyltoluene and 2.42 moles of para-tertiary butyltoluene yielded 550 grams or 2.7 moles of 3,5-di-tertiary-butyltoluene clearly indicates that tertiary butylation of para-tertiary-butyltoluene yields 3,5-di-tertiary-butyltoluene and, accordingly, that a para-dialkyl benzene having at least one tertiary alkyl group can be used as a starting material to produce meta-dialkyl benzenes in which at least one alkyl group is a tertiary alkyl group.

*Example 2*

Isobutene (approximately 1 L./min.) was passed into a vigorously stirred mixture of 1274 g. of ethylbenzene and 323 g. of liquid hydrogen fluoride contained in a copper flask immersed in an ice bath. After six hours, gas addition was stopped and stirring continued for thirty minutes. The reaction mixture was poured on crushed ice, neutralized with excess potassium hydroxide, separated, dried and distilled through a 30 plate column. Mono-tertiary-butylethylbenzene (B. P. 204–212° C. at 760 mm.) was obtained in 41% yield based on ethylbenzene charged, 3,5-di-tertiary-butylethylbenzene (B. P. 128–131° C. at 20 mm.) was obtained in 20% yield. The 3,5-di-tertiary-butylethylbenzene cut product had the following physical properties: B. P. 1300° C. at 20 mm.; $n_D^{20}$ 1.4890; $d_4^{20}$ 0.8575. The 3,5-di-tertiary-butylethylbenzene structure was confirmed by comparison of the infrared and ultraviolet spectra with those of other 1,3,5-trialkylbenzenes.

A mixture of 45.7 g. of 3,5-di-tertiary-butylethylbenzene, 50.4 g. of toluene and 70 g. of liquid anhydrous hydrogen fluoride was stirred vigorously for two hours in a copper flask immersed in an ice bath. The reaction mixture was poured on crushed ice, neutralized with excess potassium hydroxide, separated, dried and fractionally distilled. The composition of product, estimated from the distillation curve, was:

| | G. |
|---|---|
| Toluene | 21.3 |
| Ethylbenzene | 6.0 |
| Tertiary-butyltoluene | 32.1 |
| Tertiary-butylethylbenzene | 21.3 |
| 3,5-di-tertiary-butylbenzene | 4.7 |

The tertiary-butylethylbenzene fraction (B. P. 93–96° C./20 mm., $n_D^{20}$ 1.4927) was shown by infrared spectrometric analysis to contain more than 90% of meta-tertiary-butylethylbenzene. Nitration with a mixture of concentrated sulfuric acid and fuming nitric acid gave a trinitro derivative with an odor of musk, M. P. 67.2–67.5° C.

*Example 3*

Following the procedure of Example 1, 3,5-di-tertiary-butyltoluene was produced. When phenol was substituted for meta-xylene, transfer of one tertiary-butyl group to phenol was effected and meta-tertiary-butyltoluene was produced.

*Example 4*

Following the procedure of Example 2, 3,5-di-tertiary-butylethylbenzene was produced. When benzene was substituted for toluene, transfer of one tertiary-butyl group to the benzene was effected and tertiary-butylbenzene was produced.

As illustrated by the above examples, mono-alkylbenzenes may be converted to alkyl di-tertiary-alkylbenzene by contacting them with substantial molar excesses of tertiary-alkylating agents in contact with conventional alkylation catalysts under conventional alkylating conditions. Similar results are obtained with alkylbenzenes other than toluene, such as hexyl benzene, obtained by alkylating benzene with a propylene dimer, dodecyl benzene, and octadecyl benzene. The employment of the tertiary-butyl group in the above example is for illustration only and the other tertiary-alkylating agents set forth above behave in substantially the same manner. In addition to the hydrogen fluoride catalyst employed in the examples, sulfuric acid and aluminum chloride have been found equally effective.

I claim:

1. The method of producing meta-alkyl tertiary-butyl benzenes which comprises contacting a mono-alkyl benzene hydrocarbon with a molecular excess of a tertiary-butylating agent under alkylating conditions to produce alkyl di-tertiary-butyl benzene, fractionally distilling the reaction product to separate a 1-alkyl 3,5-di-tertiary-butyl benzene fraction, contacting this fraction with a molar excess of a material selected from the group consisting of benzene, toluene, ortho-xylene, meta-xylene and phenol under mild alkylating conditions including a temperature below about 70° C. to produce a reaction product containing a meta-alkyl tertiary-butylbenzene and substantially free of para-alkyl tertiary-butylbenzenes and fractionally distilling the reaction product to separate a fraction consisting essentially of meta-alkyl tertiary-butyl benzene.

2. The method of producing meta-alkyl tertiary-butyl benzenes which comprises contacting a material of the group consisting of mono-alkyl benzene hydrocarbons and para-alkyl tertiary-butyl benzene hydrocarbons with a molar excess of a tertiary-butylating agent under alkylating conditions to produce alkyl di-tertiary-butyl benzene, fractionally distilling the reaction product to separate a 1-alkyl-3,5-di-tertiary-butyl benzene fraction, contacting this fraction with a material selected from the group consisting of benzene, toluene, ortho-xylene, meta-xylene and phenol under alkylating conditions to produce a reaction product containing a meta-alkyl tertiary-butyl benzene and substantially free of para-alkyl tertiary-butyl benzenes, and fractionally distilling the reaction product to separate a fraction comprising a meta-alkyl tertiary-butyl benzene.

3. The method of producing meta-alkyl tertiary-butyl benzenes which comprises contacting a para-alkyl tertiary-butyl benzene with a molar excess of a tertiary-butylating agent under alkylating conditions to produce a trialkyl benzene containing at least two tertiary-butyl groups, fractionally distilling the reaction product to separate a 1-alkyl-3,5-di-tertiary-butyl benzene fraction, contacting this fraction with a material selected from the group consisting of benzene, toluene, ortho-xylene, meta-xylene and phenol under mild alkylating conditions including a temperature below about 70° C. to produce a reaction product containing a meta-alkyl tertiary-butyl benzene and substantially free of para-alkyl tertiary-butyl benzenes, and fractionally distilling the reaction product to separate a fraction consisting essentially of a meta-alkyl tertiary-butyl benzene.

4. The method of producing meta-tertiary-butyl toluene which comprises contacting toluene with a molar excess of a tertiary-butylating agent under alkylating conditions to produce di-tertiary-butyl toluene, fractionally distilling the reaction product to separate a 3,5-di-tertiary-butyl toluene fraction, contacting this fraction with a molar excess of a material selected from the group consisting of benzene, toluene, ortho-xylene, meta-xylene and phenol under mild alkylating conditions including a temperature below about 70° C. to produce a reaction product containing meta-tertiary-butyl toluene and substantially free of para-tertiary-butyl toluene, and fractionally distilling the reaction product to separate a fraction consisting essentially of meta-tertiary-butyl toluene.

5. The process of claim 4 wherein the alkyl acceptor reagent is meta-xylene.

References Cited in the file of this patent

UNITED STATES PATENTS

| 2,385,524 | Mattox | Sept. 25, 1945 |
| 2,429,691 | Johnson et al. | Oct. 28, 1947 |
| 2,598,715 | Nichols | June 3, 1952 |
| 2,648,713 | Schneider | Aug. 11, 1953 |
| 2,700,689 | McCaulay et al. | Jan. 25, 1955 |

OTHER REFERENCES

De Capeller, Chem. Abst., vol. 22, pp. 1339–40 (1928) (2 pages).

Nightingale et al.: Jour. Amer. Chem. Soc., vol. 64, pp. 1662–5 (4 pages) (July 1942).